(12) United States Patent
Cietwierkowski et al.

(10) Patent No.: US 10,416,861 B2
(45) Date of Patent: Sep. 17, 2019

(54) METHOD AND SYSTEM FOR DETECTION AND RESOLUTION OF FRUSTRATION WITH A DEVICE USER INTERFACE

(71) Applicant: BlackBerry Limited, Waterloo (CA)

(72) Inventors: Marcin Cietwierkowski, Kitchener (CA); Nazih Almalki, Waterloo (CA); Robert George Oliver, Waterloo (CA); Zhe Chen, Kitchener (CA); Andrew Michael Inwood, Kitchener (CA)

(73) Assignee: BlackBerry Limited, Waterloo (CA)

( * ) Notice: Subject to any disclaimer, the term of this patent is extended or adjusted under 35 U.S.C. 154(b) by 404 days.

(21) Appl. No.: 15/092,259

(22) Filed: Apr. 6, 2016

(65) Prior Publication Data

US 2017/0293417 A1    Oct. 12, 2017

(51) Int. Cl.

| | |
|---|---|
| *G06F 3/0484* | (2013.01) |
| *G06F 3/0488* | (2013.01) |
| *G06F 3/00* | (2006.01) |
| *G06F 3/16* | (2006.01) |
| *G06F 17/22* | (2006.01) |
| *G06F 9/451* | (2018.01) |

(52) U.S. Cl.
CPC .......... *G06F 3/04845* (2013.01); *G06F 3/005* (2013.01); *G06F 3/0488* (2013.01); *G06F 3/167* (2013.01); *G06F 9/451* (2018.02); *G06F 17/2235* (2013.01); *G06F 2203/011* (2013.01); *G06F 2203/04805* (2013.01); *G06F 2203/04806* (2013.01)

(58) Field of Classification Search
CPC ..... G06F 3/04845; G06F 3/005; G06F 3/0488
See application file for complete search history.

(56) References Cited

U.S. PATENT DOCUMENTS

| | | | |
|---|---|---|---|
| 7,103,852 B2 | 9/2006 | Kairls | |
| 8,875,061 B1 | 10/2014 | Lee | |
| 9,098,109 B2 | 8/2015 | Lappalainen et al. | |
| 2003/0038807 A1* | 2/2003 | Demos | G09G 5/006 345/473 |

(Continued)

FOREIGN PATENT DOCUMENTS

WO    2009148776 A2    12/2009

OTHER PUBLICATIONS

European Patent Office, Extended European Search Report for Application No. 17162038.8, dated Jul. 31, 2017.

(Continued)

*Primary Examiner* — Li P Sun
(74) *Attorney, Agent, or Firm* — Moffat & Co

(57) ABSTRACT

A method for user interface interaction on a computing device, the method including detecting frustration with a user interface interaction on the computing device; determining a location of input events on a display of the computing device; and magnifying an area proximate to the location of input events. Further, a computing device includes a processor; and a user interface, wherein the computing device, using the processor and user interface, is configured to detect frustration with a user interface interaction on the computing device; determine a location of input events on a user interface of the computing device; and magnify an area proximate to the location of input events.

19 Claims, 11 Drawing Sheets

(56) References Cited

U.S. PATENT DOCUMENTS

| | | | |
|---|---|---|---|
| 2003/0182394 A1* | 9/2003 | Ryngler | G01C 21/3629 709/217 |
| 2005/0047629 A1* | 3/2005 | Farrell | G06F 3/013 382/117 |
| 2006/0190822 A1 | 8/2006 | Basson | |
| 2007/0300174 A1 | 12/2007 | Macbeth | |
| 2010/0082516 A1 | 4/2010 | Basu | |
| 2010/0146444 A1 | 6/2010 | Wang | |
| 2011/0283189 A1 | 11/2011 | McCarty | |
| 2012/0185420 A1 | 7/2012 | Lappalainen | |
| 2012/0226993 A1 | 9/2012 | Bromer | |
| 2014/0258856 A1 | 9/2014 | Mauro | |
| 2015/0206000 A1* | 7/2015 | el Kaliouby | G06K 9/00315 382/118 |

OTHER PUBLICATIONS

J. Klein et al, "This computer responds to user frustration: Theory, design, and results", Interacting with Computers: 14 (2002) p. 119-140, 2002.

Thomas Claburn, "Goodle Researching Real-Time Frustration Detection", Information Week, http://www.informationweek.com/google-researching-real-time-frustration-detection/d/d-id/1092610, Sep. 20, 2010.

European Patent Office, Examination Report for Application No. 17162038.8, dated Dec. 7, 2018.

\* cited by examiner

METHOD AND SYSTEM FOR DETECTION AND RESOLUTION OF FRUSTRATION WITH A DEVICE USER INTERFACE

FIELD OF THE DISCLOSURE

The present disclosure relates to a user interface on a device and in particular relates to facilitating interaction between a user and the user interface.

BACKGROUND

Electronic devices provide a user interface to allow a user to interact with applications running on the device. Such devices may include portable devices such as tablets or smartphones. Other devices may include laptops or desktop computers, among others. Interaction with such devices may be through a touch screen, mouse, pointer or other similar input mechanism.

At times, a user of such device may become frustrated with the device user interface (UI) when the UI is too small to interact with. For example, the user may be trying to click a hyperlink or touch a small, touch sensitive, UI element. If the user repeatedly misses such element, the user may become frustrated. The missing of the element may be due to the touch element being too small or the screen size being too small in some cases. In other cases, the user may be impaired in some way. The repeated attempt to utilize a UI element may lead to poor user experience and user frustration.

BRIEF DESCRIPTION OF THE DRAWINGS

The present disclosure will be better understood with reference to the drawings, in which.

DETAILED DESCRIPTION

The present disclosure provides a method for user interface interaction on a computing device, the method comprising: detecting frustration with a user interface interaction on the computing device; determining a location of input events on a display of the computing device; and magnifying an area proximate to the location of input events.

The present disclosure further provides a computing device comprising: a processor; and a user interface, wherein the computing device, using the processor and user interface, is configured to: detect frustration with a user interface interaction on the computing device; determine a location of input events on a user interface of the computing device; and magnify an area proximate to the location of input events.

The present disclosure further provides a non-transitory computer readable medium containing program code, which when executed by a processor of a computing device, cause the computing device to: detect frustration with a user interface interaction on the computing device; determine a location of input events on a display of the computing device; and magnify an area proximate to the location of input events.

Figure 1:
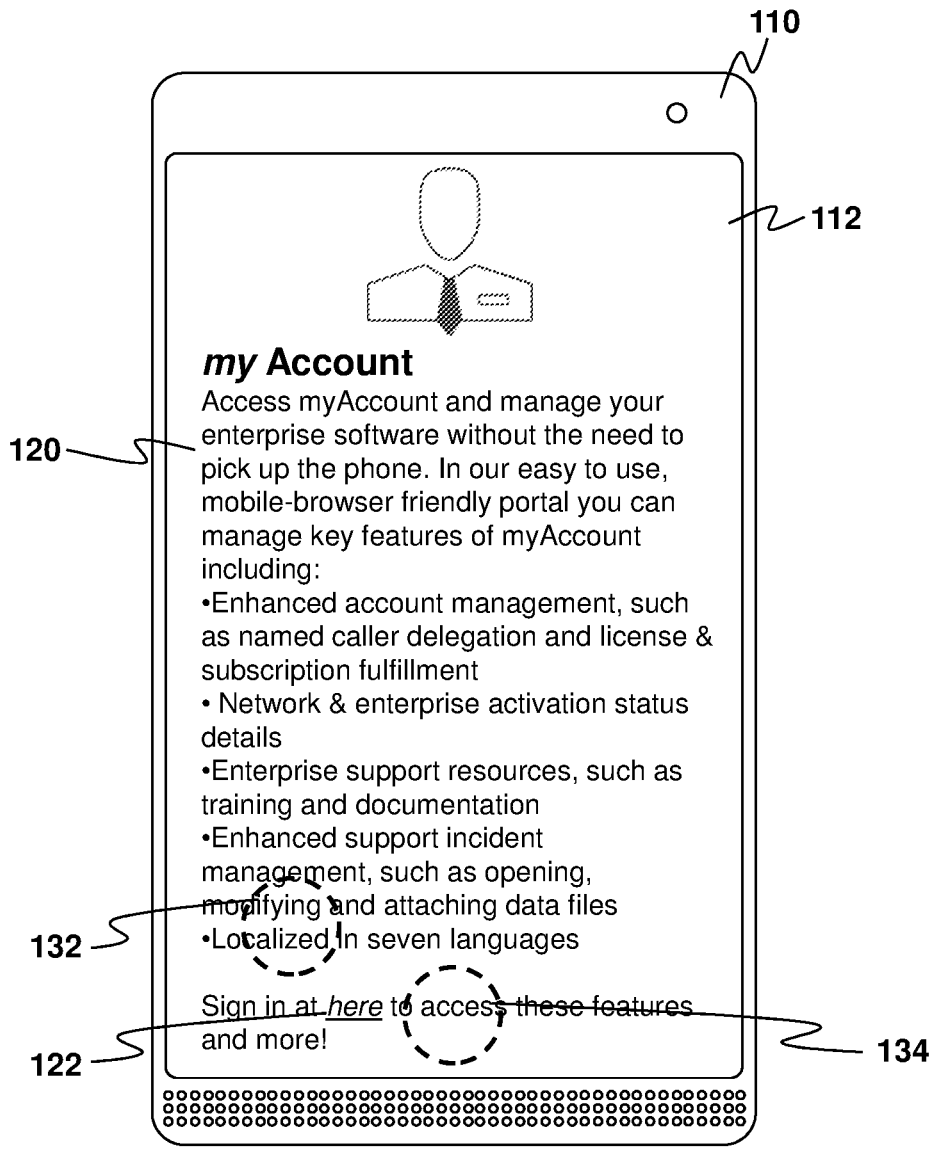
FIG. 1 is a front elevational view of a mobile device showing a display at a first magnification.

Reference is now made to FIG. 1, which shows a small screen device 110 which may include, but is not limited to a smartphone or tablet. In the example of FIG. 1, a touch screen 112 displays information to a user. For example, a browser application on the device 110 may be displaying output for the browser application on the screen 112.

In the example of FIG. 1, the touch screen 112 includes content 120 along with a hyperlink 122 to advance the browser application. In some cases, the hyperlink 122 may be relatively small and may be difficult for a user to correctly press.

In the example of FIG. 1, a user attempts to press hyperlink 122 but the device registers touches at, for example, locations 132 and 134. Such touches have no UI element associated with them and therefore no action occurs for the application.

Due to the repeated touches, as explained in more detail below, the device 110 may detect that the user is becoming frustrated and therefore, in accordance with embodiments of the present disclosure, action may be taken to alleviate the frustration of the user.

In particular, in various embodiments of the present disclosure, the device may detect if a user is frustrated by identifying when the user is hitting substantially the same area of the screen without triggering any UI elements or through utilization of other sensors such as the accelerometer, camera, microphone, keyboard, peripheral sensor, piezoelectric sensor, force sensor, strain gauges or other input mechanism on the device to detect frustration. If user frustration is detected, the device may transition into a frustrated user state in which UI elements may be made larger or other action may be taken to alleviate user frustration. Once such user frustration is no longer detected, or once the system detects successful selection of a UI element, or a change in user focus to another section of the UI, the system may then return to a normal function state.

While the example of FIG. 1 describes a browser application, the present disclosure is not limited to any particular application.

In accordance with one embodiment of the present disclosure, the action to alleviate frustration may be may universally applied for every application on the device. In other embodiments, applications may subscribe to or opt out of the frustrated user state for one or more applications in order to best utilize the device 110. For example, if the application on display 112 is a game, the repeated touching of the screen or the detection of harder touches through an accelerometer may be ignored. However, for applications such as a browser, word processing application, telephone application or other applications, frustration is not a desirable state for the user to be in and therefore the present disclosure provides that the user frustration may be alleviated.

Figure 2:
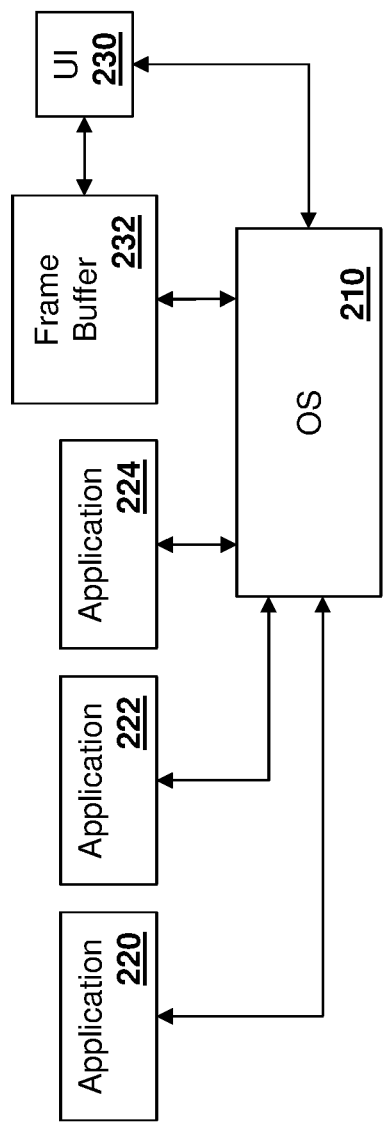
FIG. 2 is a block diagram showing an operating system interacting with applications, a user interface and a frame buffer.

Reference is now made to FIG. 2, which shows a simplified block diagram of a running environment of the device. In the example of FIG. 2, an operating system 210 runs on the device and provides the management of the device functionality. It allows applications, such as applications 220, 222 and 224 to execute on the device. Operating system (OS) 210 further provides access to the user interface 230 for applications. Such access for display output may be realized, for example, through a frame buffer 232.

The UI 230 may further provide user input, which is registered through the operating system 210, for applications 220, 222 and 224. For example, a mouse click or a touch on a touch sensitive display may be made through a UI 230.

An application, such as application 220, may be the foreground application and therefore has user focus. Other applications may be running in the background. Typically, a user can only interact with one foreground application at a given time. Operating system 210 will know the application that is the foreground application and therefore will have a context of the interactions that are occurring on the device.

Figure 3:
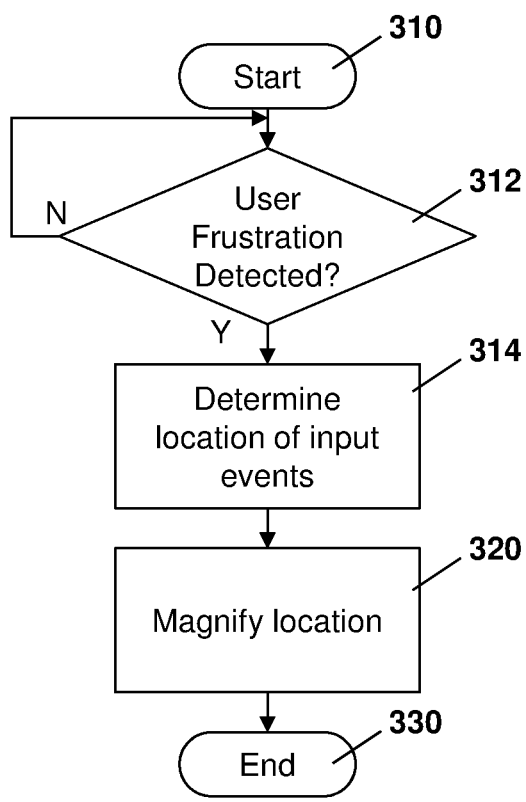
FIG. 3 is a process diagram showing a process in accordance with a first embodiment of the present disclosure.

Utilizing the running environment of FIG. 2, reference is now made to FIG. 3. In a first embodiment of the present disclosure the device detects that the user is frustrated and may magnify a portion of the screen in order to alleviate user frustration.

In particular, the process of FIG. 3 starts at block 310 and proceeds to block 312 in which a check is made to determine whether user frustration is detected. User frustration may be detected in a number of ways. In a first scenario, user frustration may be detected through the repeated touching of the user interface in locations that do not trigger any user interface elements such as hyperlinks or buttons. The repeated touching of the user interface or clicking on the user interface in a particular area of the display without any results may predict user frustration and cause the process to continue to block 314.

In other embodiments, user frustration may be detected through a combination of sensors. For example, an accelerometer may be utilized to allow the device to detect when the touch interface is being touched with more force. Force sensors, for example piezoelectric sensors or strain gauges, may also be used to determine an increase in applied force. Such touching with more force may be lead to higher accelerometer, or other sensor, readings and may indicate to the device that the user is becoming frustrated.

In other embodiments, a sensor such as the microphone may be utilized. For example, if a user is swearing at the device or becoming vocal or saying certain phrases which may be detected by the device then the device may determine that the user is becoming frustrated.

Further, the camera on a device may be utilized in certain scenarios. For example, the camera could detect the face of the user and determine that the user is becoming frustrated through facial recognition and in particular emotion recognition.

In other embodiments, a combination of any of the above could be utilized to detect user frustration.

Other examples of sensors or combinations of sensors for use in detecting frustration are also possible.

If no user frustration is detected the process continues to loop to block 312 until user frustration is detected.

Once user frustration is detected at block 312, the process proceeds to block 314 in which the device determines the location of the input events that may be causing the user frustration. Thus, for example, in FIG. 1 the user was touching the screen near the hyperlink but was not quite hitting the hyperlink. In this case, the device determines that the user is touching a portion of the screen near the bottom left corner.

In other examples, the UI element may be located anywhere on the screen and thus the determination at block 314 may be to a particular quadrant, subsection or portion of the screen of the display.

In the embodiment of FIG. 3, the process then proceeds to block 320 in which the location of the input events is magnified. For example, this may be done by the operating system interacting with frame buffer 232. The operating system could indicate or grab a portion of the frame buffer and magnify that portion of the frame buffer for output to the display of user interface 230.

Once the portion of the screen is magnified the process may proceed to block 330 and end.

In the embodiment of FIG. 3, once the user presses the hyperlink to move to the next screen for example, then the screen may restore the default magnification level for the particular application that has the display focus.

In an alternative embodiment, the application may need to be restored to the default magnification level after the user frustration has ended. For example, in a word processing application, once the user frustration has ended then the display may be returned to the magnification level that existed prior to the frustration event. Thus, reference is made to FIG. 4.

Figure 4:
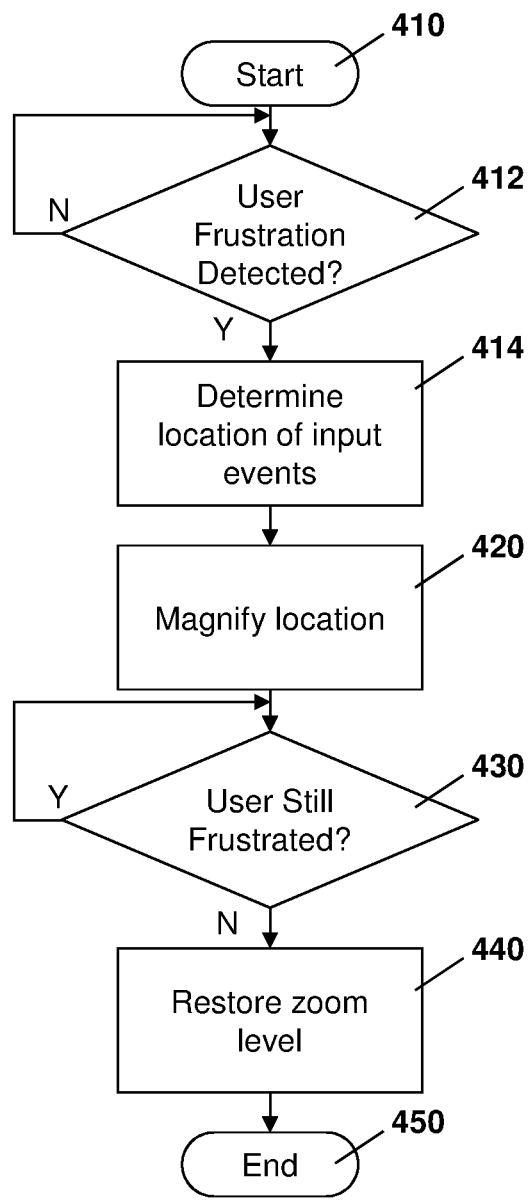
FIG. 4 is a process diagram showing a process in accordance with a second embodiment of the present disclosure.

In FIG. 4 the process starts at block 410 and proceeds to block 412 in which a check is made to determine whether the user is frustrated. If not the process continues to loop to block 412.

If user frustration is detected, for example as described above with reference to block 312, then the process proceeds to block 414 in which the location of the input events is determined.

From block 414 the process then proceeds to block 420 in which the user interface near the location of the input events is magnified to alleviate user frustration.

From block 420 the process then proceeds to block 430 in which a check is made to determine whether the user is still frustrated. The check at block 430 may, for example, determine that the strength of the touch events has decreased, may detect through facial recognition that the frustration level has reduced, may detect through the microphone input that the frustration has decreased, a combination of the above or other mechanisms. If the check at block 430 determines that the user is still frustrated, then the process proceeds back to block 430 and continues to loop until a reduced level of user frustration is detected.

Once the frustration level has been detected to have decreased, then the process proceeds to block 440 in which the application magnification defaults are restored to the levels that existed previous to the magnification at block 420. A prompt may be provided to the user before magnification is decreased in some embodiments.

From block 440 the process proceeds to block 450 and ends.

In still further embodiments, the application context for a foreground application may be important in determining whether or not to magnify a portion of the screen. For example, certain applications may wish to opt out of magnification or the type of application may determine that the screen should not be magnified.

For example, certain applications may provide a trigger or notification to the operating system that they do not wish to have the UI or display magnified, even if a frustration event occurs. Thus when an application is loaded onto the device or run for the first time, the application may register that it wishes to opt in or opt out of magnification when the user is frustrated.

In other embodiments, the device may have a table of application types and applications that are registered within those particular application types may not be magnified.

For example, a device may store a table such as Table 1 below.

TABLE 1

| Application Types | |
| --- | --- |
| Application Identifier | Type |
| ID1 | 1 |
| ID2 | 2 |
| ID3 | 2 |

As seen in Table 1 above, each application has a unique identifier within the operating system and the application type may be assigned to that particular application. In the example of Table 1 only two application types namely type 1 and type 2 are provided. Type 1 would be applications that allow for magnification and type 2 are applications that do not allow for magnification.

In other embodiments instead of type 1 and type 2, a particular application type may be registered. For example, an application may be a "game" type and in this case the application would not be magnified. Another application may be a "browser" type and therefore may allow for magnification. Other examples are possible.

Figure 5:
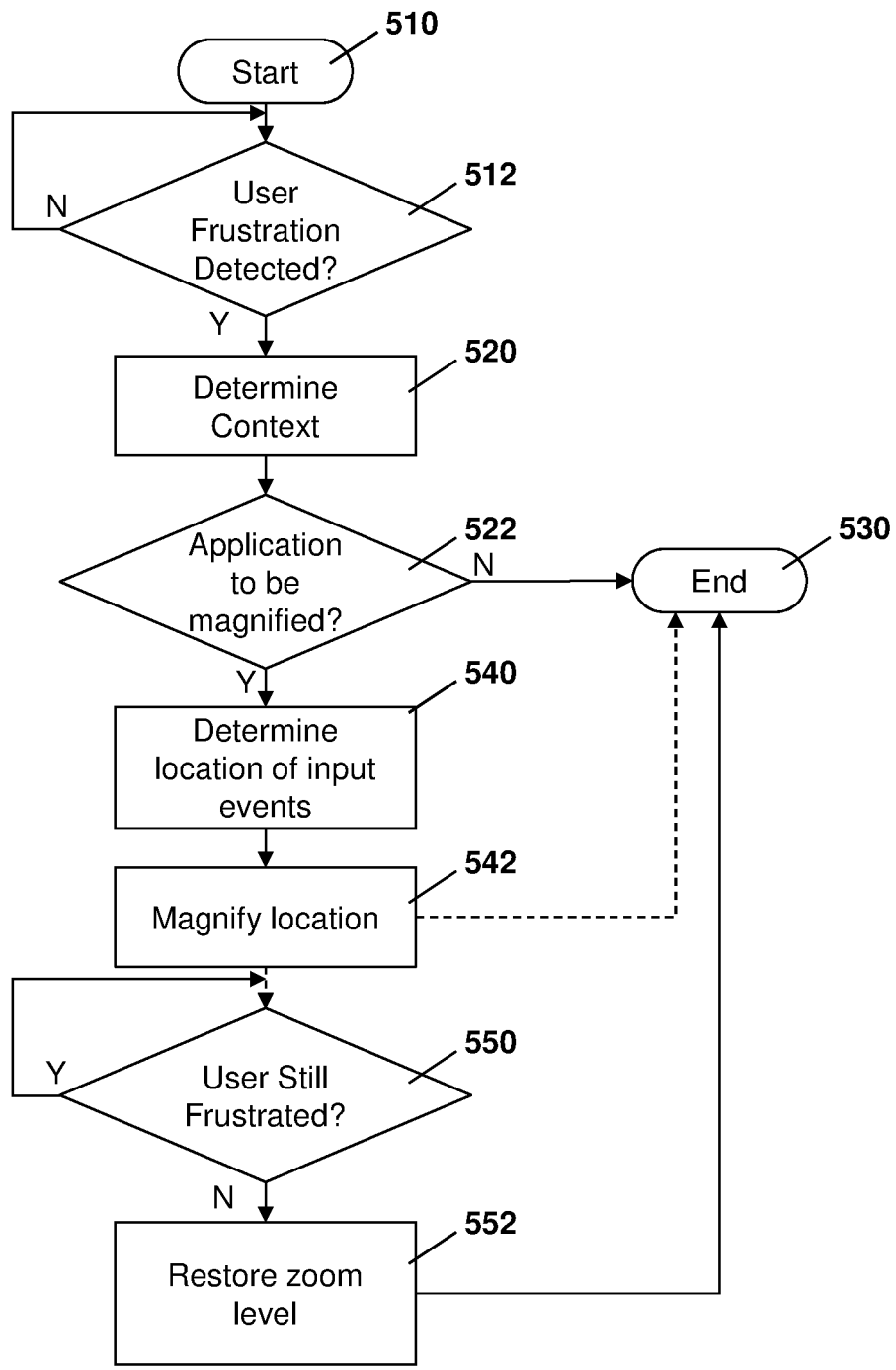
FIG. 5 is a process diagram showing a process in accordance with a third embodiment of the present disclosure.

The context of the application may then be utilized to determine whether magnification should be permitted. Reference is now made to FIG. 5.

In the embodiment of FIG. 5, the process starts at block 510 and proceeds to block 512 in which a determination is made of whether the user is frustrated. If, at block 512, it is determined that the user is not frustrated then the process may proceed back to block 512 until user frustration is detected.

Once user frustration is detected, the process proceeds from block 512 to block 520 in which a context for the particular foreground application is determined. As indicated above, the context may be that the application has opted out of or into magnification, or may be based on a table of application types such as Table 1 above.

From block 520 the process proceeds to block 522 in which a check is made to determine whether, based on the context, the application is to be magnified. If no, the process proceeds from block 522 to block 530 and ends.

Conversely, if it is determined at block 522 that the application may be magnified based on the context, the process may then proceed to block 540 in which the location of the input events is found and the process then proceeds to block 542 in which the location is magnified.

From block 542, in one embodiment the process may proceed to block 530 and end. In other embodiments, the process may proceed to block 550 in which a determination is made of whether the user is still frustrated. If yes, then the process continues to loop to block 550.

From block 550, if the user is no longer frustrated the process may then proceed to block 552 in which the application default magnification, that is the magnification that existed prior to block 542, is restored.

From block 552 the process then proceeds to block 530 and ends.

Figure 6A:
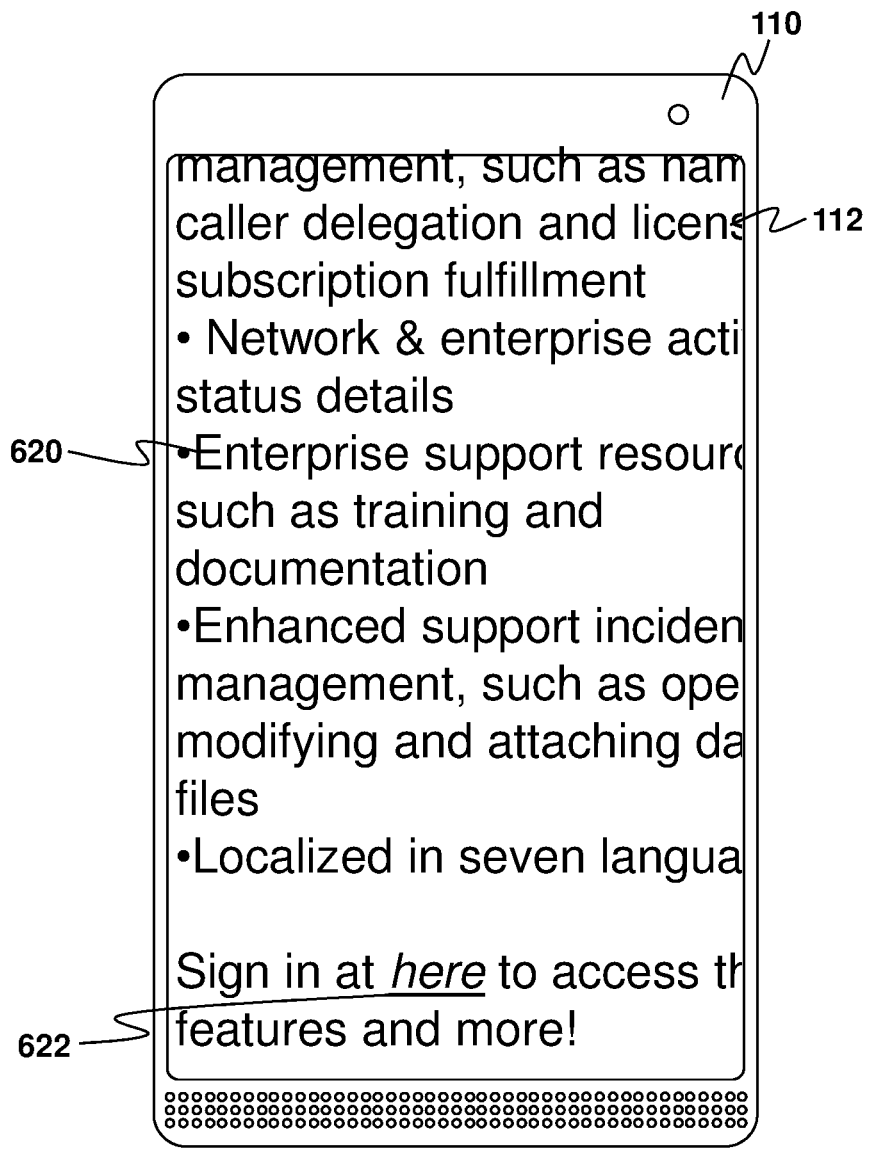
FIG. 6A is a front elevational view of a mobile device showing a display at a second magnification.

Thus, in the embodiments of FIGS. 2 to 5, the operating system magnifies a portion of the screen to alleviate user frustration. Reference is made to FIG. 6A, showing an example of a magnified display of device 110 from FIG. 1. In particular, display 112 now has zoomed content 620 with a larger hyperlink or UI element 622, making interaction with the UI element easier and thus alleviating user frustration.

Figure 6B:
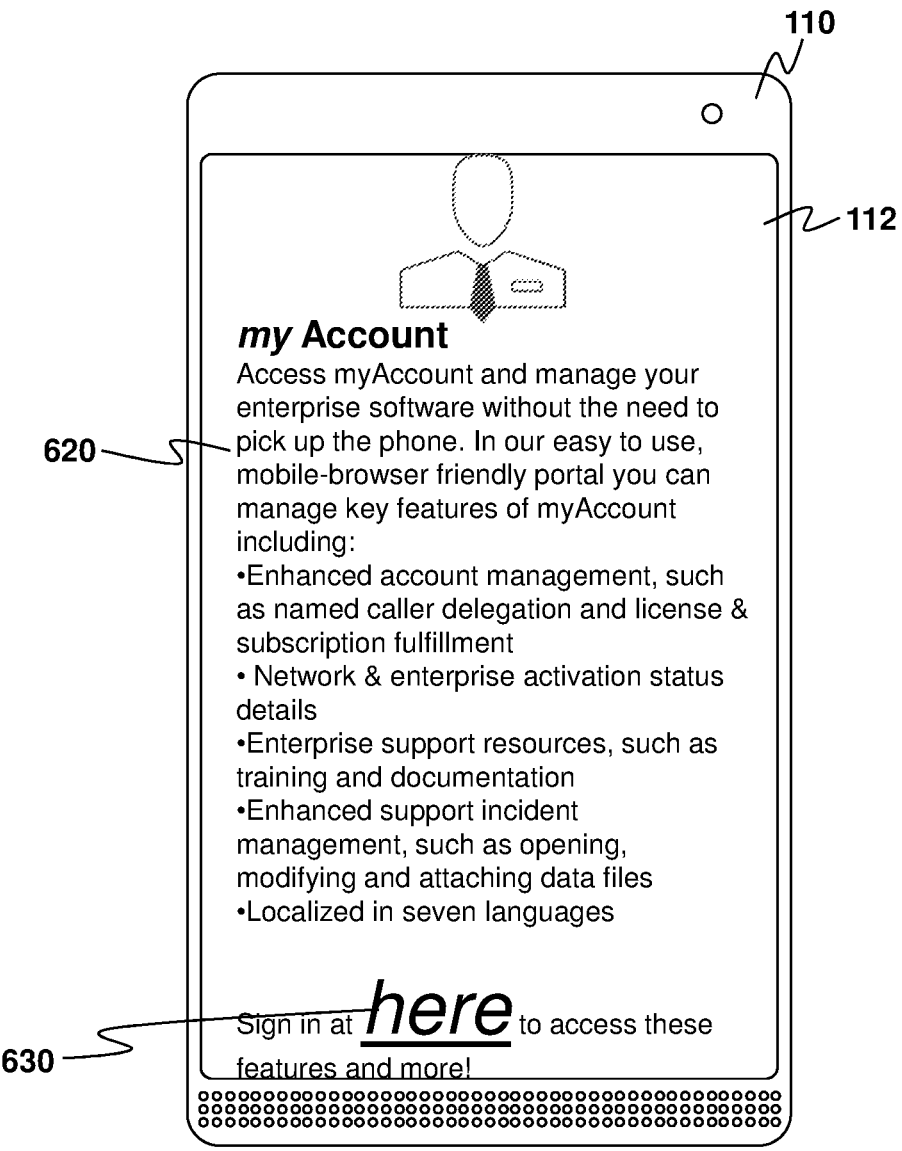
FIG. 6B is a front elevational view of a mobile device showing a display with a UI element magnified.

Alternatively, in one embodiment only the UI element or elements within the area that the user interacting with is enlarged. Reference is now made to FIG. 6B, which shows that the hyperlink 630 is enlarged, while the remaining text or content remains at the same magnification. The remaining text or content may be formatted to accommodate the enlarged UI element in one embodiment. For example, the remaining content may wrap around the enlarged UI element or elements, may be moved further up or down on the display, among other options.

Figure 6C:
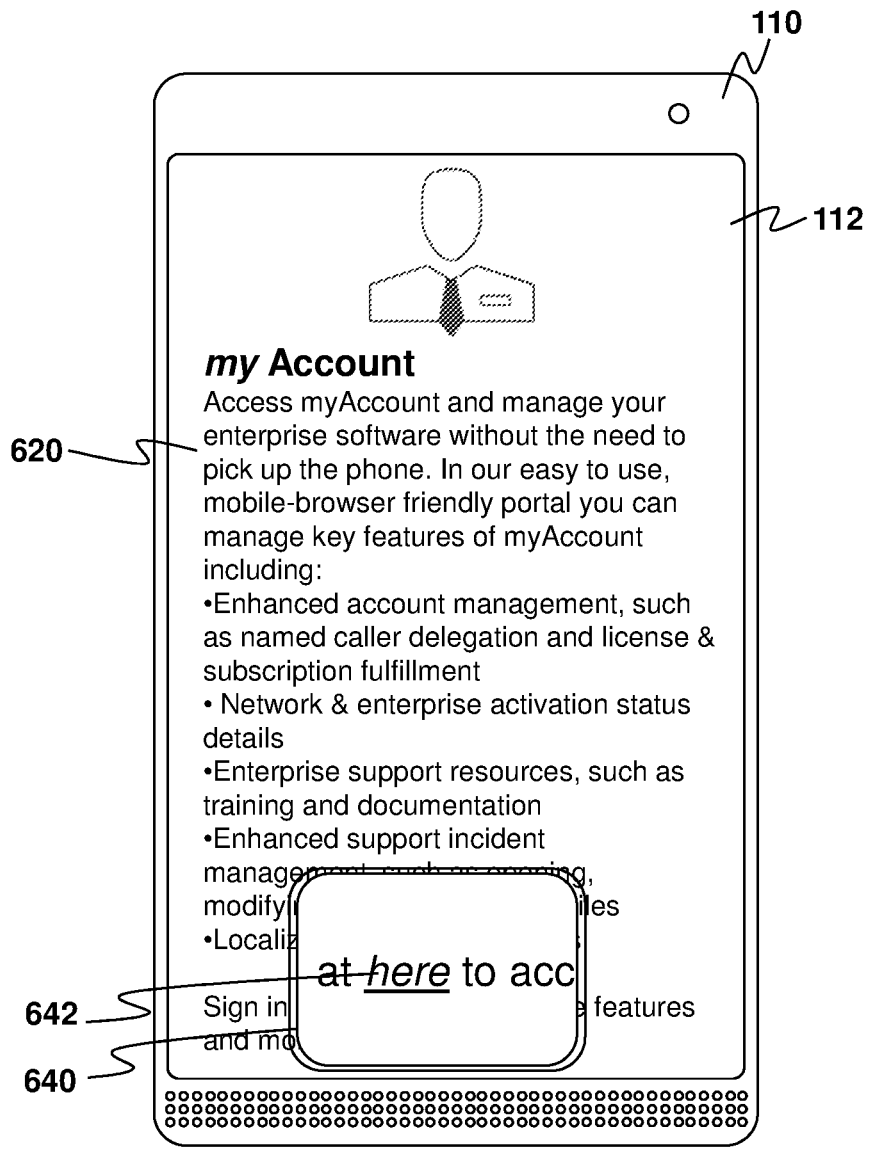
FIG. 6C is a front elevational view of a mobile device showing a display with a magnified window showing a UI element.

In a further embodiment, a magnification of only part of the screen may occur. Referring to FIG. 6C, magnification window 640 may overlay display 620 and may include UI element 642.

Other magnification options are possible, and the embodiments of FIGS. 6A, 6B and 6C are merely examples.

In still further embodiments, instead of the operating system on a device magnifying a particular location, functionality to alleviate user frustration may be allocated at the application level. In this case, the operating system may send alerts globally and applications may subscribe to such alerts and alter their behavior according to application programming.

Figure 7:
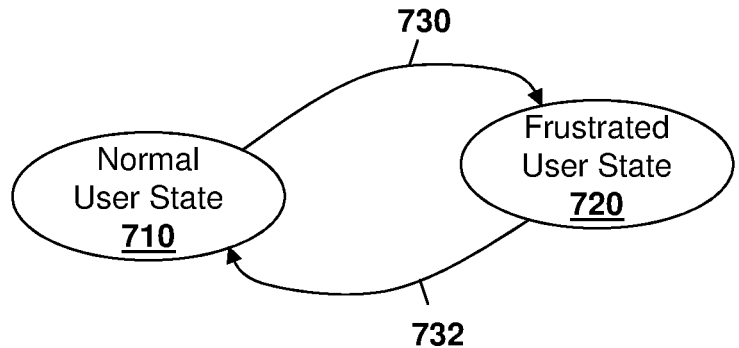
FIG. 7 is a state diagram showing that the device may be in a normal or a frustrated user state.

The device may therefore keep a state of the device. In particular, reference is now made to FIG. 7, which shows that the device may be in a normal state 710 or a frustrated user state 720.

The device may transition from normal state 710 to frustrated user state 720, as shown by arrow 730, if user frustration is detected. Such detection may occur as described above based on one or more sensed events.

Similarly, when the device detects that the frustration level of the user has decreased, the device may transition back to normal state 710 as shown by arrow 732. Again, the detection that the user is no longer in a frustrated user state may depend on one or more sensors or user interface elements, including a change in the screen, detection through accelerometers, cameras, microphones or other sensors, among other events as described above.

Figure 8:
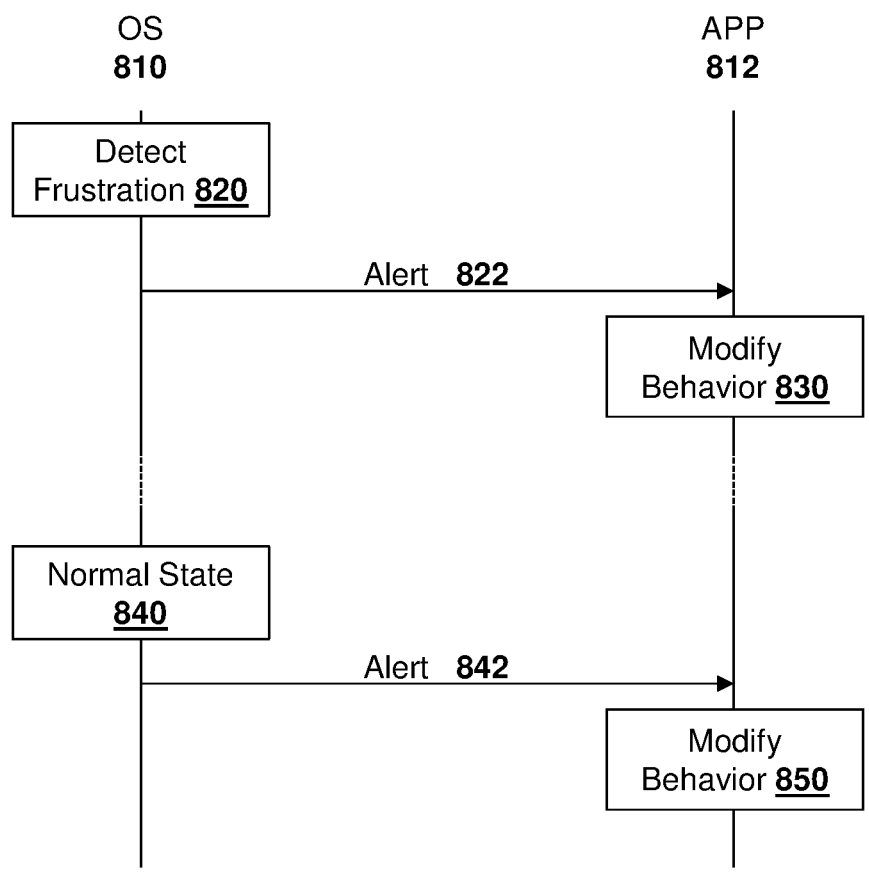
FIG. 8 is a dataflow diagram showing alerts being provided from an operating system to an application upon a change of state of the device.

Reference is now made to FIG. 8, which shows a dataflow diagram. In the embodiment of FIG. 8, the operating system 810 communicates with an application 812. Application 812 may, for example, be the foreground application.

At block 820 the operating system detects that the user is frustrated and moves the device to a frustrated user state 720.

Application 812 has subscribed to a system wide alert dealing with user frustration, and therefore operating system 810 provides alert 822 to application 812.

Upon receiving the alert, application 812 may then modify the behavior of the application in order to alleviate the frustration, as shown by block 830. For example, the application may magnify a portion of the screen the user is attempting to interact with.

Since the solution to user frustration is application specific, other behaviors are also possible. For example, application 812 may provide alternative user interface elements, such as larger buttons or a customized magnified UI. Application 812 may instead provide prompts or other notifications requesting other user feedback, may connect the user of the device to a support or help desk for the application, may request whether the user wants to use voice commands, among other functionality. The present disclosure is not limited to any particular functionality for the modification of the behavior at block 830 and the examples above are merely illustrative.

Subsequently the device may detect that the user is no longer frustrated and transition into a normal user state 710. This detection is shown at block 840 in the example of FIG. 8. The operating system may then provide an alert 842 to subscribed applications to indicate that the user is no longer frustrated.

In one embodiment, application 812, upon receiving alert 842, may modify its behavior, as shown by block 850. Such modification may cause the application to run in a similar manner to its operations before the modification of block 830.

However, in other embodiments, application 812 may choose to ignore alert 842 and continue with the modified UI state in order to continue to alleviate user frustration.

Thus, in accordance with the embodiment of FIG. 8, the application itself modifies its behavior to alleviate user frustration. This therefore allows application developers to make a determination of how to alleviate frustration and implement such a solution individually.

In other embodiments, a combination of the embodiments of any of FIGS. 3 to 8 may be made. Thus, for example, if an application is subscribed for the alerts that the user is entering a frustrated user state then the operating system may allow the application to handle such state. Otherwise, the operating system may provide for magnification through the frame buffer, either in every case, or based on the context of the application.

Further, in the embodiment of FIG. 8, an application may be subscribed to an alert but may choose to ignore such alert. Thus, if the application wishes to avoid having magnification by default it may subscribe to the alert 822 but may then choose to ignore such alert to avoid any default behavior occurring on the device.

Other examples are possible.

The above may be implemented on any device. For example, one simplified device is illustrated with regards to FIG. 9.

Figure 9:
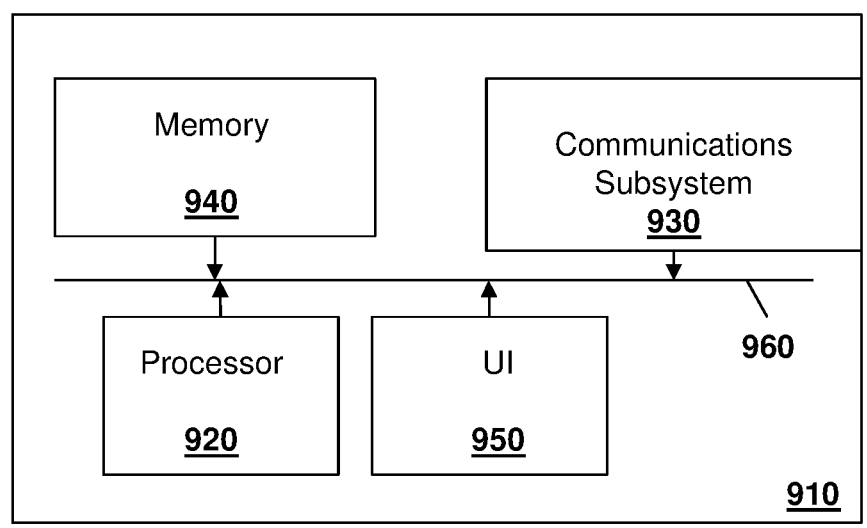
FIG. 9 is a block diagram of a simplified device capable of implementing the embodiments of the present disclosure.

In FIG. 9, device 910 includes a processor 920 and a communications subsystem 930, where the processor 920 and communications subsystem 930 cooperate to perform the methods of the embodiments described above.

Processor 920 is configured to execute programmable logic, which may be stored, along with data, on device 910, and shown in the example of FIG. 9 as memory 940. Memory 940 can be any tangible storage medium.

Alternatively, or in addition to memory 940, device 910 may access data or programmable logic from an external storage medium, for example through communications subsystem 930.

Communications subsystem 930 allows device 910 to communicate with other devices or network elements.

A user interface, which may include a display and input means, is provided as UI 950.

Communications between the various elements of network element 910 may be through an internal bus 960 in one embodiment. However, other forms of communication are possible.

In one embodiment, device 910 may be a user equipment. Any user equipment (UE) could be used to implement the above. One example user equipment is shown with regards to FIG. 10.

UE 1000 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1000 is enabled for two-way communication, it may incorporate a communication subsystem 1011, including both a receiver 1012 and a transmitter 1014, as well as associated components such as one or more antenna elements 1016 and 1018, local oscillators (LOs) 1013, and a processing module such as a digital signal processor (DSP) 1020. Although not shown, communication subsystem 1011 may include additional components. For example, UE 1000 may comprise multiple receivers 1012 and/or transmitters 1014 to allow for simultaneous radio activity. In addition, as will be apparent to those skilled in the field of communications, the particular design of the communication subsystem 1011 will be dependent upon the communication network in which the device is intended to operate.

Network access requirements will also vary depending upon the type of network 1019. In some networks network access is associated with a subscriber or user of UE 1000. A UE may require one or more smart cards which can contain different applications such as a USIM, RUIM or a SIM application in order to operate on a network. The smart card interface 1044 is normally similar to a card-slot into which a smart card can be inserted and ejected. The smart card can have memory and hold many key configurations 1051, and other information 1053 such as identification, and subscriber related information.

Figure 10:
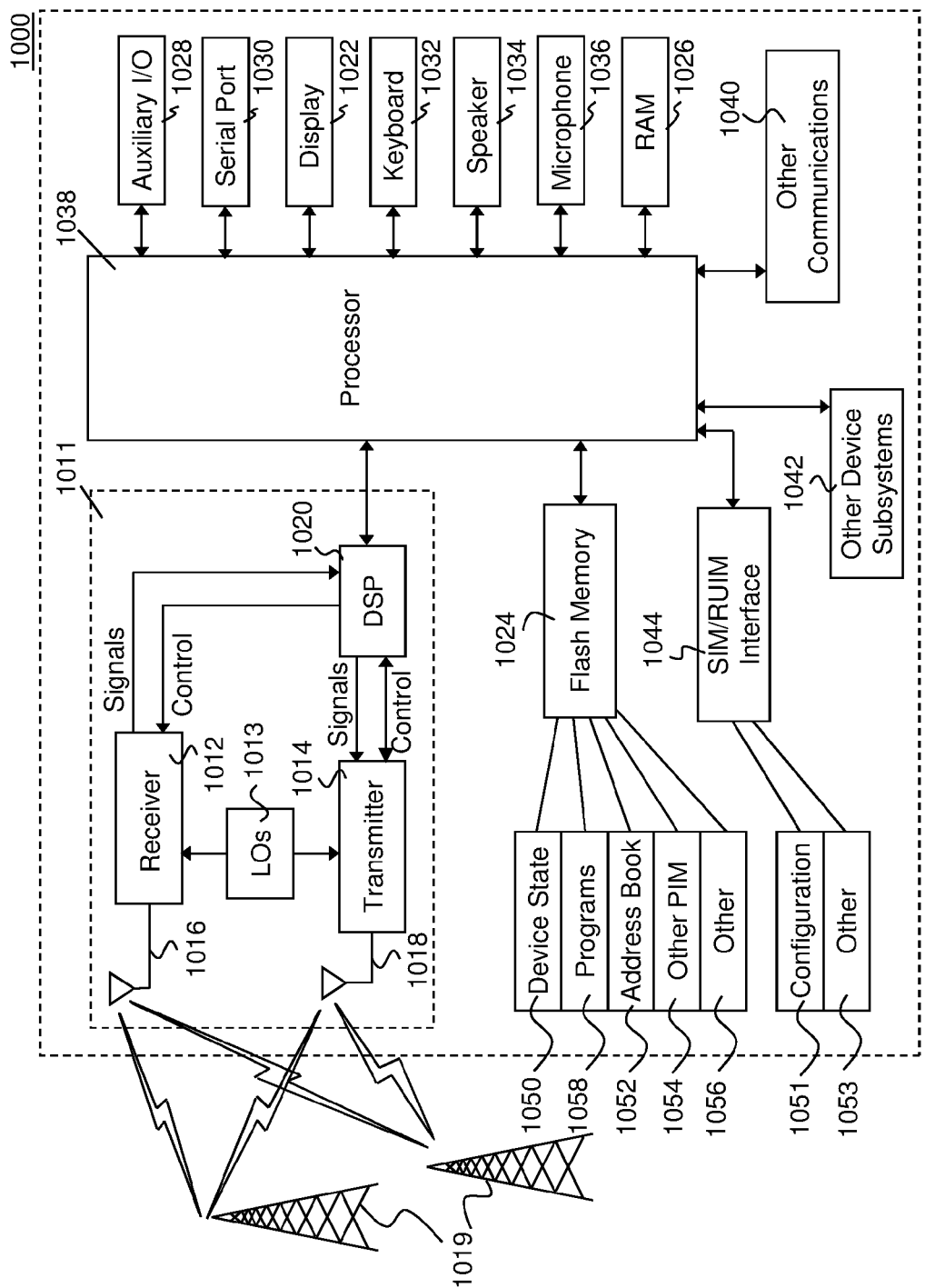
FIG. 10 is a block diagram of an example user equipment capable of implementing the embodiment of the present disclosure.

When required network registration or activation procedures have been completed, UE 1000 may send and receive communication signals over the network 1019. As illustrated in FIG. 10, network 1019 can consist of multiple base stations communicating with the UE.

Signals received by antenna 1016 through communication network 1019 are input to receiver 1012, which may perform such common receiver functions as signal amplification, frequency down conversion, filtering, channel selection and the like. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

UE 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the UE. A predetermined set of applications that control basic operations, including at least data and voice communication applications for example, will normally be installed on UE 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape), flash drive, hard drive, or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1019. Further applications may also be loaded onto the UE 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the UE 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of UE 1000 may also compose data items such as email messages for example, using the keyboard 1032, which may be a complete alphanumeric keyboard or telephone-type keypad, among others, in conjunction with the display 1022 and possibly an auxiliary I/O device 1028. In other embodiments display 1022 may be touch sensitive and keyboard 1032 may be virtual. Such composed items may then be transmitted over a communication network through the communication subsystem 1011.

For voice communications, overall operation of UE 1000 is similar, except that received signals would typically be output to a speaker 1034 and signals for transmission would be generated by a microphone 1036. Alternative voice or audio I/O subsystems, such as a voice message recording subsystem, may also be implemented on UE 1000. Although voice or audio signal output is generally accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type UE for which synchronization with a user's desktop computer (not shown) may be desirable, but is an optional device component. Such a port 1030 would enable a user to set preferences through an external device or software application and would extend the capabilities of UE 1000 by providing for information or software downloads to UE 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the UE to a computer to act as a modem or to a wall outlet or computer as a charging source.

Other communications subsystems 1040, such as a short-range communications subsystem, is a further optional component which may provide for communication between UE 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as WiFi or WiMAX. Subsystem 1040 may further include sensors including accelerometers, cameras, among others.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

For example, the present disclosure may be illustrated through the clauses below.

AA. A method for providing a user interface on a computing device, the method comprising:
detecting input indicative of user frustration with the computing device;
determining a display location associated with input events relating to the detected input; and
enlarging at least a portion of the user interface proximate to the display location associated with the input events.

AB. The method of clause AA, wherein the input indicative of user frustration comprises detecting repeated inputs at a portion of the user interface, such repeated inputs not resulting in selection of a user interface element.

AC. The method of clause AA or AB, further comprising detecting input events from a sensor indicating increased input force.

AD. The method of any one of clauses AA to AC, wherein the detecting input indicative of user frustration comprises detecting audio cues utilizing a microphone of the computing device.

AE. The method of any one of clauses AA to AD, wherein the detecting input indicative of user frustration comprises detecting visual cues utilizing a camera of the computing device.

AF. The method of any one of clauses AA to AE, wherein the enlarging is performed by an operating system using a frame buffer of the computing device.

AG. The method of clause AF, wherein the enlarging is performed for all applications executing on the computing device.

AH. The method of clause AF, wherein the enlarging is performed based on foreground application context.

AI. The method of any one of clauses AA to AE, wherein the enlarging is performed based on an alert sent from an operating system to an application on the device.

AJ. The method of clause AI, wherein the application subscribes for the alert.

AK. The method of any one of clauses AI to AJ, wherein the application further invokes frustration reduction techniques comprising at least one of: accepting voice commands; connecting to a help desk for the application; and changing an output user interface for the application.

AL. A computing device comprising: a processor; and a user interface, wherein the computing device, using the processor and user interface, is configured to perform the method of one of clauses AA to AK.

AM. A non-transitory computer readable medium containing program code, which when executed by a processor of a computing device, cause the computing device to perform the method of any one of clauses AA to AK.

The invention claimed is:

1. A method for providing a user interface on a computing device, the method comprising:
detecting input indicative of user frustration with the computing device, wherein detecting the input indicative of user frustration comprises detecting repeated inputs at a displayed portion of the user interface, such repeated inputs being near a displayed user interface element and not resulting in selection of any displayed user interface element of the user interface; and
in response to the detected input indicative of user frustration:
determining a display location associated with input events relating to the detected input, the determined display location corresponding to the displayed user interface element; and
enlarging only the displayed user interface element, wherein a selection of the displayed user interface element triggers performing an associated computing function.

2. The method of claim 1, wherein the detecting input indicative of user frustration comprises detecting audio cues utilizing a microphone of the computing device.

3. The method of claim 1, wherein the detecting input indicative of user frustration comprises detecting visual cues utilizing a camera of the computing device.

4. The method of claim 1, wherein the enlarging is performed by an operating system using a frame buffer of the computing device.

5. The method of claim 4, wherein the enlarging is performed for all applications executing on the computing device.

6. The method of claim 4, wherein the enlarging is performed based on foreground application context.

7. The method of claim 1, wherein the enlarging is performed based on an alert sent from an operating system to an application on the device.

8. The method of claim 7, wherein the application subscribes for the alert.

9. The method of claim 7, wherein the application further invokes frustration reduction techniques comprising at least one of: accepting voice commands; connecting to a help desk for the application; and changing an output user interface for the application.

10. A computing device comprising:
a processor; and
a user interface,
wherein the computing device, using the processor and user interface, is configured to:
detect input indicative of user frustration with the computing device, wherein detecting input indicative of user frustration comprises detecting repeated inputs at a displayed portion of the user interface, such repeated inputs near a displayed user interface element and not resulting in selection of any displayed user interface element of the user interface; and
in response to the detected input indicative of user frustration:
determine a display location associated with input events relating to the detected input, the determined display location corresponding to the displayed user interface element; and
enlarge only the displayed user interface element, wherein a selection of the displayed user interface element triggers performing an associated computing function.

11. The computing device of claim 10, wherein the computing device is configured to detect input indicative of user frustration by detecting audio cues utilizing a microphone of the computing device.

12. The computing device of claim 10, wherein the computing device is configured to detect input indicative of user frustration by detecting visual cues utilizing a camera of the computing device.

13. The computing device of claim 10, wherein the computing device is configured to enlarge through an operating system using a frame buffer of the computing device.

14. The computing device of claim 13, wherein the computing device is configured to enlarge all applications executing on the computing device.

15. The method of claim 13, wherein the computing device is configured to enlarge based on foreground application context.

16. The computing device of claim 10, wherein the computing device is configured to enlarge based on an alert sent from an operating system to an application on the device.

17. The computing device of claim 16, wherein the application subscribes for the alert.

18. The computing device of claim 16, wherein the application further invokes frustration reduction techniques comprising at least one of: accepting voice commands; connecting to a help desk for the application; and changing an output user interface for the application.

19. A non-transitory computer readable medium containing program code, which when executed by a processor of a computing device, cause the computing device to:
  detect input indicative of user frustration with the computing device, wherein detecting input indicative of user frustration comprises detecting repeated inputs at a displayed portion of the user interface, such repeated inputs near a displayed user interface element and not resulting in selection of any displayed user interface element of the user interface; and
  in response to the detected input indicative of user frustration:
    determine a display location associated with input events relating to the detected input, the determined display location corresponding to the displayed user interface element; and
    enlarge only the displayed user interface element, wherein a selection of the displayed user interface element triggers performing an associated computing function.

* * * * *